(12) United States Patent
Liu

(10) Patent No.: US 9,477,104 B2
(45) Date of Patent: Oct. 25, 2016

(54) SOURCE DRIVER WITH REDUCED NUMBER OF LATCH DEVICES

(71) Applicant: Orise Technology Co., Ltd., Hsinchu (TW)

(72) Inventor: Yung-Yuan Liu, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 14/311,843

(22) Filed: Jun. 23, 2014

(65) Prior Publication Data

US 2014/0375360 A1 Dec. 25, 2014

(30) Foreign Application Priority Data

Jun. 24, 2013 (TW) .............................. 102122335 A

(51) Int. Cl.
*H03K 3/00* (2006.01)
*G02F 1/133* (2006.01)
*G09G 3/36* (2006.01)

(52) U.S. Cl.
CPC ......... *G02F 1/13306* (2013.01); *G09G 3/3677* (2013.01); *G09G 2300/0426* (2013.01); *G09G 2310/0286* (2013.01); *G09G 2330/021* (2013.01)

(58) Field of Classification Search
None
See application file for complete search history.

(56) References Cited

U.S. PATENT DOCUMENTS

| | | | | | |
|---|---|---|---|---|---|
| 4,710,649 | A * | 12/1987 | Lewis | ................. | H03K 19/0948 326/113 |
| 5,028,978 | A * | 7/1991 | Hall | .................. | H01L 27/11896 257/370 |
| 5,430,408 | A * | 7/1995 | Ovens | .................. | H03K 17/567 327/403 |
| 5,923,184 | A * | 7/1999 | Ooms | .................... | H03K 19/08 326/121 |
| 6,242,940 | B1 * | 6/2001 | Na | ................................. | 326/21 |
| 6,313,663 | B1 * | 11/2001 | Mueller et al. | .................. | 326/83 |
| 6,515,516 | B2 * | 2/2003 | Morgan | .......................... | 326/86 |
| 6,552,576 | B1 * | 4/2003 | Bobba | ................ | H03K 17/6874 326/113 |
| 6,708,261 | B1 * | 3/2004 | Shin et al. | ..................... | 711/167 |
| 6,903,570 | B2 * | 6/2005 | Kawase et al. | .................. | 326/38 |
| 7,724,067 | B1 * | 5/2010 | Tu | ......................... | H03K 17/687 327/427 |
| 2002/0093368 | A1 * | 7/2002 | Fulkerson | .............. | H03K 3/012 327/203 |
| 2003/0107421 | A1 * | 6/2003 | Markovic | ............. | H03K 3/0372 327/211 |
| 2005/0218943 | A1 * | 10/2005 | Padhye | ............... | G06F 13/4072 327/109 |
| 2006/0220700 | A1 * | 10/2006 | Hoover | .............. | H03K 3/35625 327/108 |
| 2009/0315118 | A1 * | 12/2009 | Yu | ......................... | H01L 27/092 257/369 |
| 2011/0193615 | A1 * | 8/2011 | Ono | ...................... | H03K 17/164 327/437 |
| 2014/0320482 | A1 * | 10/2014 | Kawanaka | ........... | G09G 3/3659 345/214 |
| 2014/0368236 | A1 * | 12/2014 | Chromczak | ...... | H03K 19/01758 326/41 |
| 2014/0375360 | A1 * | 12/2014 | Liu | ...................... | G02F 1/13306 327/108 |
| 2015/0200668 | A1 * | 7/2015 | Uesugi | ............... | H03K 19/0013 326/83 |
| 2015/0206479 | A1 * | 7/2015 | Maeda | ................... | G09G 3/344 345/107 |

\* cited by examiner

*Primary Examiner* — Lincoln Donovan
*Assistant Examiner* — Khareem E Almo
(74) *Attorney, Agent, or Firm* — Bacon & Thomas, PLLC

(57) ABSTRACT

A source driver with reduced number of latch devices includes a master latch device and at least one slave latch device. The master latch device has a first transmission gate, a first inverter, a second inverter, a first enable gate, and a second enable gate. The output of the second inverter is connected to the input of the first inverter. The at least one slave latch device has a second transmission gate, a third inverter, and a fourth inverter. When the first enable gate and the second enable gate receive a latch enable signal and a complementary latch enable signal respectively, the master latch device and the at least one slave latch device are concurrently driven to latch data.

20 Claims, 7 Drawing Sheets

SOURCE DRIVER WITH REDUCED NUMBER OF LATCH DEVICES

BACKGROUND OF THE INVENTION

1. Field of the Invention

The present invention relates to the technical field of source drivers and, more particularly, to a source driver with reduced number of latch devices.

2. Description of Related Art

FIG. 1 schematically illustrates the usage of a typical liquid crystal display (LCD) module, which includes an application processor 110, an LCD module 120, and an LCD screen 130. The application processor 110 receives an image signal from a storage device (not shown), and a clock controller 121 of the module 120 sends the image signal to a plurality of source drivers 123 through a data bus 127. The source drivers 123 of the module 120 latch the data and, in cooperation with a plurality of gate drivers 125, drive the LCD screen 130 to play the image signal on the LCD screen 130.

FIG. 2 is a diagram of a typical source driver 123 configuration. First, a first-stage latch 210 is controlled by a latch enable signal S and a complementary latch enable signal SB to fetch and buffer digital data D1-D6 on the data bus 127. Next, the digital data D1-D6 on the data bus 127 is sent to a second-stage latch 220, a level shifter 230, and a digital to analog converter (DAC) 240 for being converted into an analog voltage to output.

FIG. 3 is a circuit diagram of a typical latch circuit. When the latch enable signal S is at a high voltage VPP and the complementary latch enable signal SB is at a low voltage VGG, the latch 210 or 220 is in a sample mode, and transistors MPT, MNT allow the voltage on the input D to pass. When the latch enable signal S is at the low voltage VGG and the complementary latch enable signal SB is at the high voltage VPP, the latch 210 or 220 is in a hold mode, and the transistors MPT and MNT are closed so as to prevent the voltage on the input D from passing through he circuit, while the transistors MPHZ and MNHZ are turned on to latch the voltage passed in the sample mode. However, the required number of the source drivers 125 rapidly increase as the resolution of the LCD screen raises.

Therefore, it is desirable to provide an improved source driver device to mitigate and/or obviate the aforementioned problems.

SUMMARY OF THE INVENTION

The object of the present invention is to provide a source driver with reduced number of latch devices, which can reduce the number of transistors in the source driver and the power consumption.

According to a feature of the invention, there is provided a source driver with reduced number of latch devices, which includes a master latch device and at least one slave latch device. The master latch device has a first transmission gate, a first inverter, a second inverter, a first enable gate, and a second enable gate. The second inverter has an output connected to an input of the first inverter. The at least one slave latch device has a second transmission gate, a third inverter, and a fourth inverter. When the first enable gate and the second enable gate receive a latch enable signal and a complementary latch enable signal respectively, the master latch device and the at least one slave latch device are concurrently driven to latch data.

According to another feature of the invention, there is provided a source driver with reduced number of latch devices, which includes a master latch device and first to N-th slave latch devices, where N is an integer greater than one. The master latch device has a first transmission gate, a first inverter, a second inverter, a first enable gate, and a second enable gate. The second inverter has an output connected to an input of the first inverter. Each of the first to N-th slave latch devices has a second transmission gate, a third inverter, and a fourth inverter. The first and second enable gates are connected to the fourth inverter of each slave latch device respectively. When the first enable gate and the second enable gate receive a latch enable signal and a complementary latch enable signal respectively, the master latch device and the first to N-th slave latch devices are concurrently driven to latch data.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
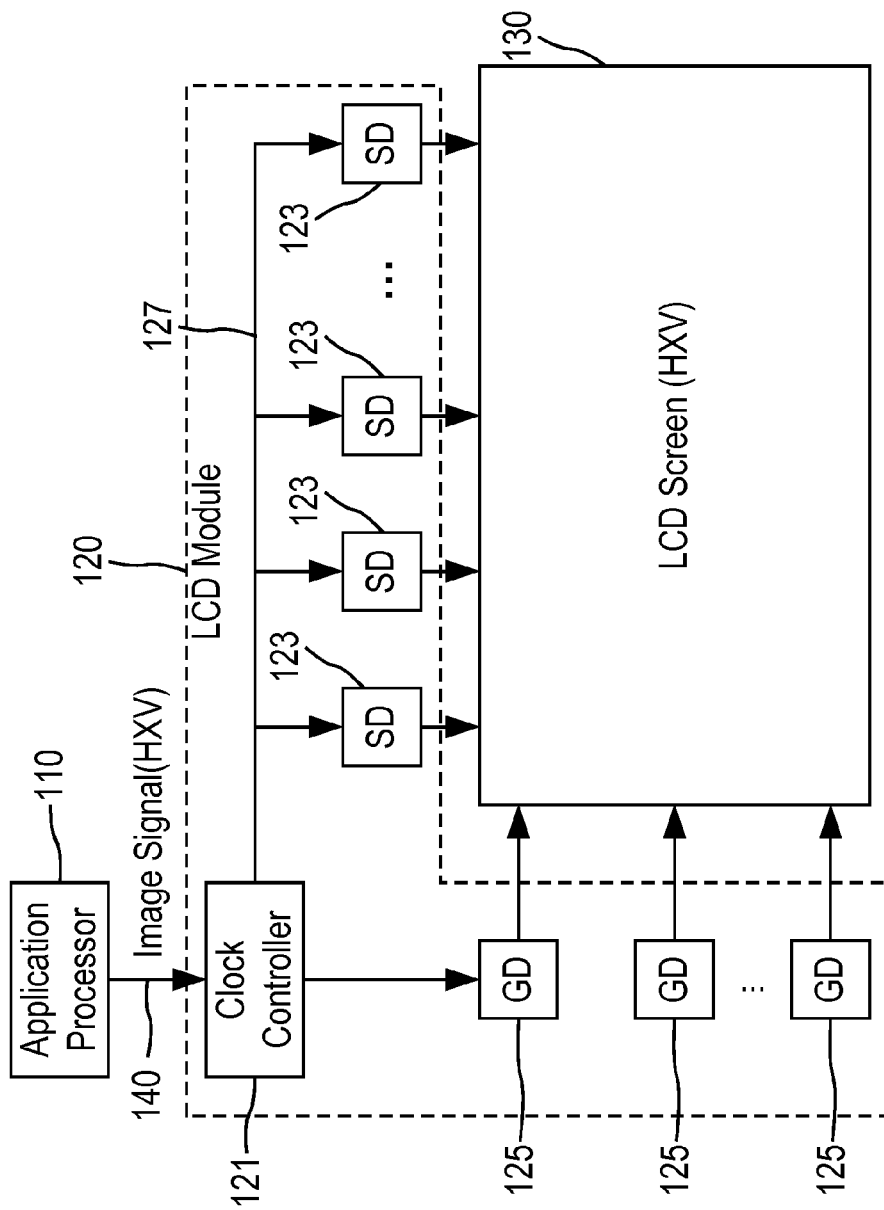
FIG. 1 is a schematic diagram of a typical LCD module application.
Figure 2:
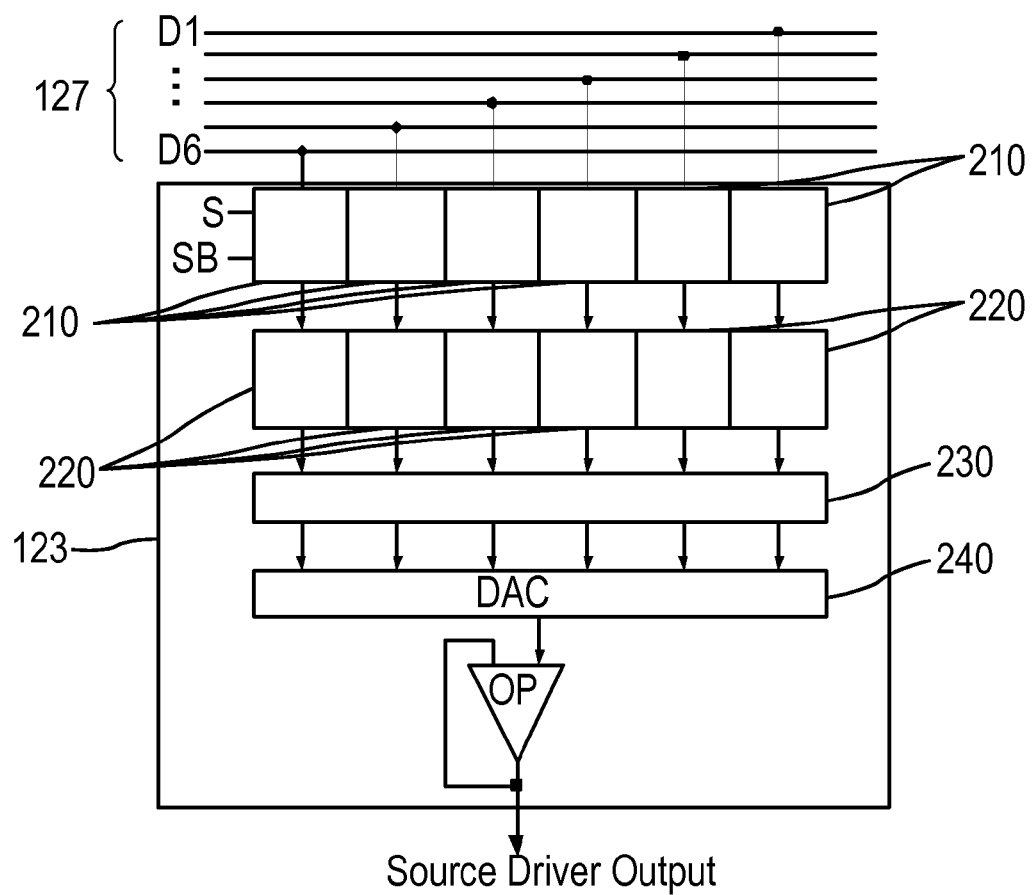
FIG. 2 is a diagram of a typical source and gate driver configuration.
Figure 3:
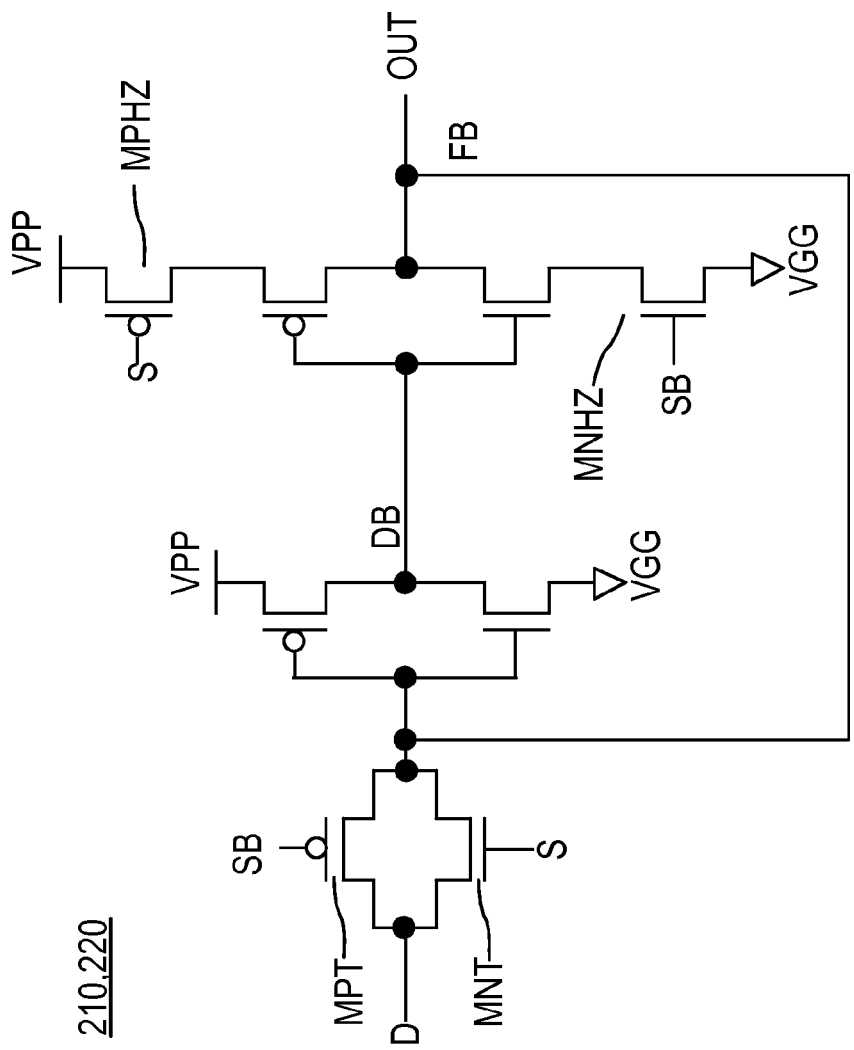
FIG. 3 is a circuit diagram of a typical latch.
Figure 4:
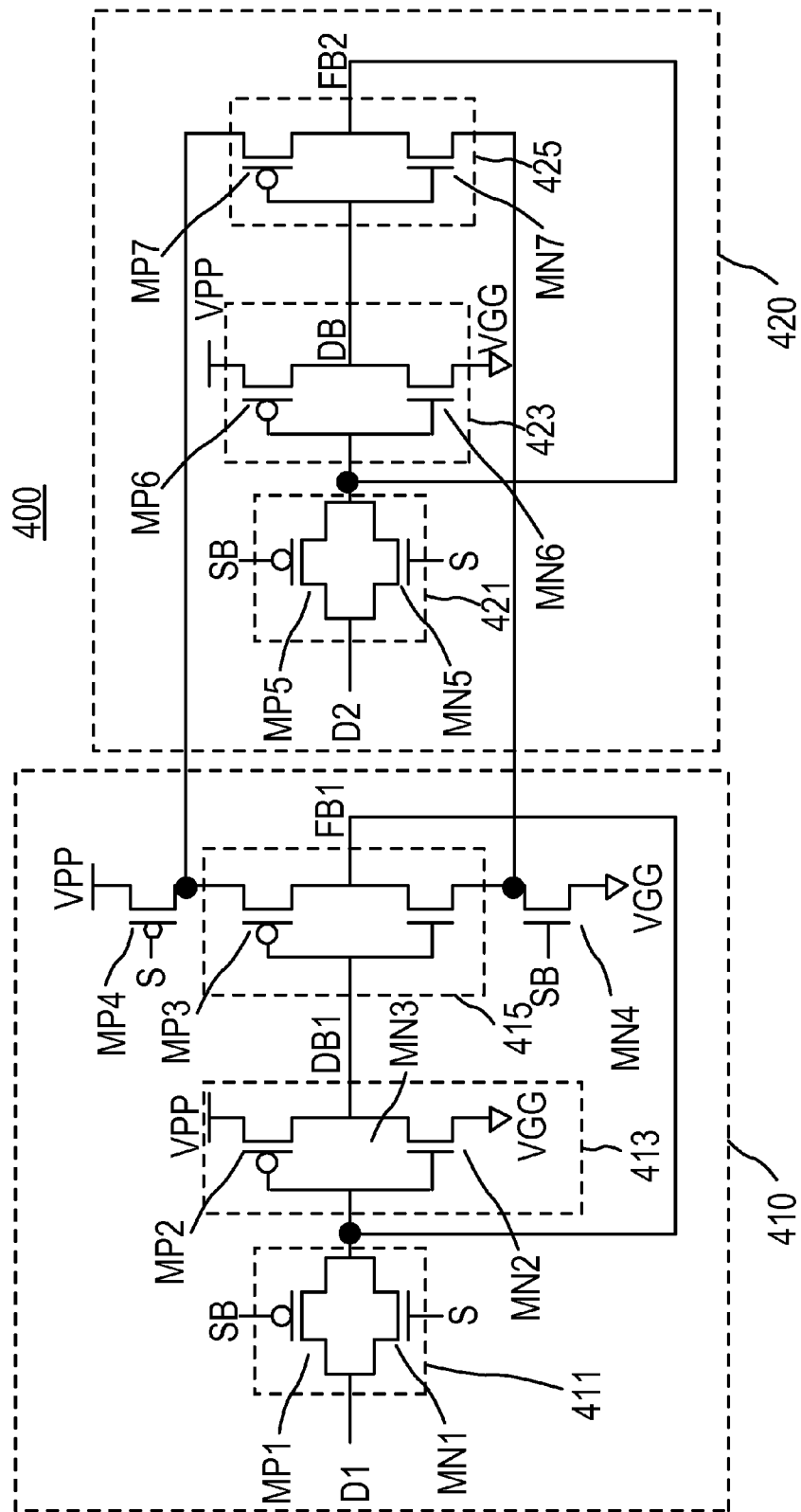
FIG. 4 is a circuit diagram of a source driver with reduced number of latch devices according to the invention.

FIG. 4 is a circuit diagram of a source driver 400 with reduced number of latch devices according to the invention. The source driver 400 includes a master latch device 410 and at least one slave latch device 420. The master latch device 410 has a transmission gate 411, a first inverter 413, a second inverter 415, a first enable gate MP4, and a second enable gate MN4. The second inverter 415 has an output FB1 connected to the input of the first inverter 413.

The at least one slave latch device 420 has a transmission gate 421, a third inverter 423, and a fourth inverter 425. When the first enable gate MP4 and the second enable gate MN4 receive a latch enable signal S and a complementary latch enable signal SB respectively, the master latch device 410 and the at least one slave latch device 420 are concurrently driven to latch data. Namely, when the latch enable signal S is at a low voltage VGG and the complementary latch enable signal SB is at a high voltage VPP, the master latch device 410 and the at least one slave latch device 420 are employed to latch data.

As shown in FIG. 4, the transmission gate 411 of the master latch device 410 is connected to receive a first input signal D1. An input of the first inverter 413 is connected to the transmission gate 411 of the master latch device 410 in order to perform a phase inversion on the first input signal D1. The second inverter 415 has an input connected to an output of the first inverter 413, and an output FB 1 connected to the input of the first inverter 413. The first enable gate MP4 and the second enable gate MN4 are connected to the second inverter 415. Accordingly, the master latch device 410 is formed.

The transmission gate 421 of the slave latch device 420 is connected to receive a second input signal D2. An input of the third inverter 423 is connected to the transmission gate 421 of the slave latch device 420 in order to perform a phase inversion on the second input signal D2. The fourth inverter 425 has an input connected to an output of the third inverter 423, and an output FB2 connected to the input of the third inverter 423. The first enable gate MP4 and the second enable gate MN4 are also connected to the fourth inverter 425 of the slave latch device 420. Accordingly, the slave latch device 420 is formed.

The master transmission gate 411 of the master latch device 410 is comprised of a first PMOS transistor MP1 and a first NMOS transistor MN1. The first inverter 413 is comprised of a second PMOS transistor MP2 and a second NMOS transistor MN2. The second inverter 415 is comprised of a third PMOS transistor MP3 and a third NMOS transistor MN3. The first enable gate is comprised of a fourth PMOS transistor MP4. The second enable gate is comprised of a fourth NMOS transistor MN4.

The slave transmission gate 421 of the slave latch device 420 is comprised of a fifth PMOS transistor MP5 and a fifth NMOS transistor MN5. The third inverter 423 is comprised of a sixth PMOS transistor MP6 and a sixth NMOS transistor MN6. The fourth inverter 425 is comprised of a seventh PMOS transistor MP7 and a seventh NMOS transistor MN7.

The first PMOS transistor MP1 has a source connected to receive the first input signal D1 and a gate connected to the complementary latch enable signal SB. The first NMOS transistor MN1 has a drain connected to receive the first input signal D1, a gate connected to receive the latch enable signal S, and a source connected to a drain of the first PMOS transistor MP1.

The second PMOS transistor MP2 has a source connected to a high voltage VPP, and a gate connected to the drain of the first PMOS transistor MP1. The second NMOS transistor MN2 has a drain connected to a drain of the second PMOS transistor MP2, a gate connected to the drain of the first PMOS transistor MP1, and a source connected to a low voltage VGG.

The fourth PMOS transistor MP4 has a source connected to the high voltage VPP, and a gate connected to receive the latch enable signal S. The fourth NMOS transistor MN4 has a source connected to the low voltage VGQ, and a gate connected to receive the complementary latch enable signal SB.

The third PMOS transistor MP3 has a source connected to a drain of the fourth PMOS transistor MP4, a gate connected to the drain of the second PMOS transistor MP2, and a drain connected to the drain of the first PMOS transistor MP1 and a first output terminal FB1. The third NMOS transistor MN3 has a source connected to a drain of the fourth NMOS transistor MN4, a gate connected to the drain of the second PMOS transistor MP2, and a drain connected to the drain of the third PMOS transistor MP3.

The fifth PMOS transistor MP5 has a source connected to receive the second input signal D2, and a gate connected to receive the complementary latch enable signal SB. The fifth NMOS transistor MN5 has a drain connected to receive the second input signal D2, a gate connected to receive the latch enable signal S, and a source connected to a drain of the fifth PMOS transistor MP5.

The sixth PMOS transistor MP6 has a source connected to the high voltage VPP, and a gate connected to the drain of the fifth PMOS transistor MP5. The sixth NMOS transistor MN6 has a drain connected to a drain of the sixth PMOS transistor MP6, a gate connected to the drain of the fifth PMOS transistor MP5, and a source connected to the low voltage VGG.

The seventh PMOS transistor MP7 has a source connected to the drain of the fourth PMOS transistor MP4, a gate connected to the drain of the sixth PMOS transistor MP6, and a drain connected to the drain of the fifth PMOS transistor MP5 and a second output terminal FB2. The seventh NMOS transistor MN7 has a source connected to the drain of the fourth NMOS transistor MN4, a gate connected to the drain of the sixth PMOS transistor MP6, and a drain connected to the drain of the seventh PMOS transistor MP7.

Figure 5:
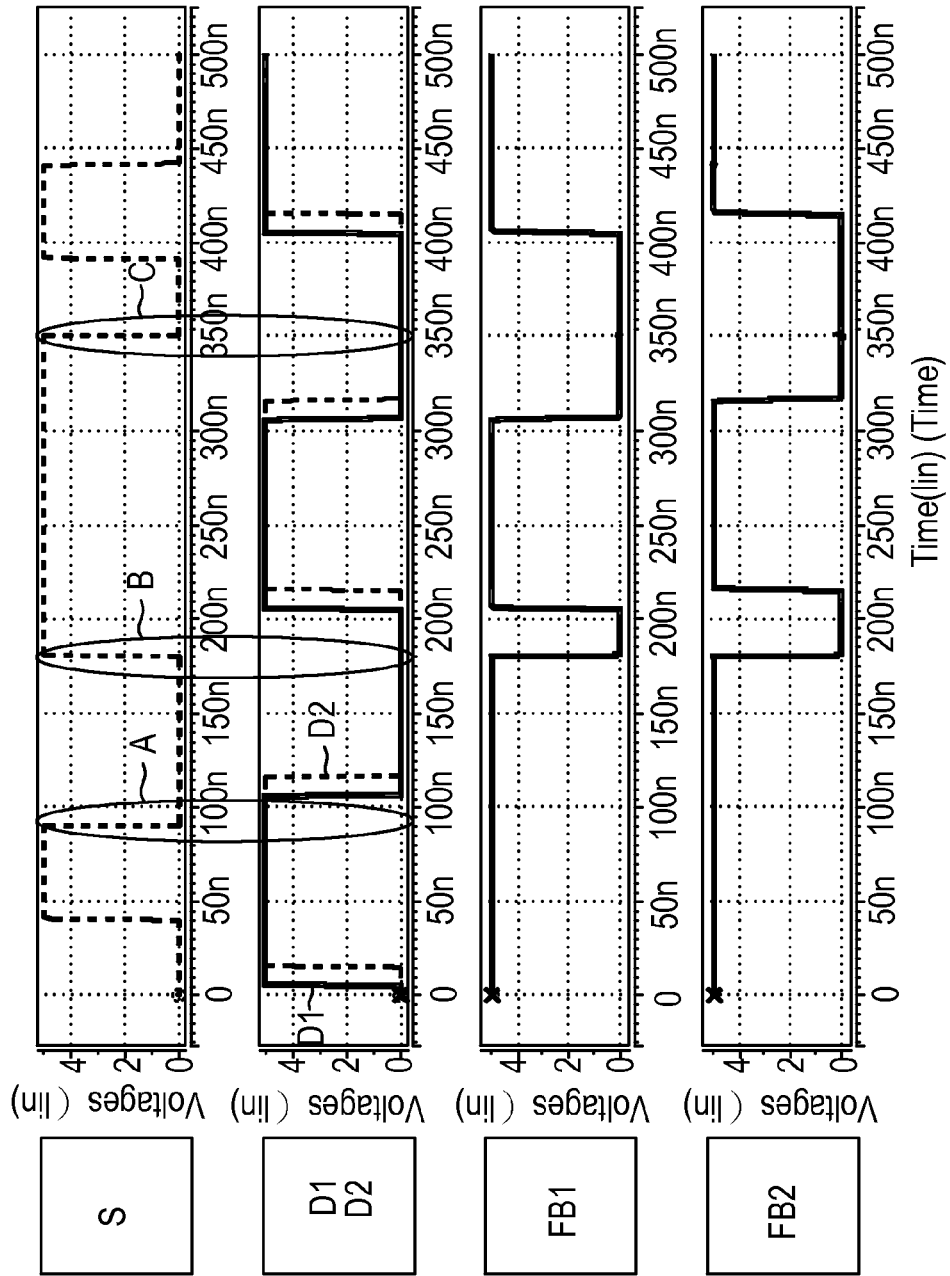
FIG. 5 schematically illustrates an operation simulation of a source driver with reduced number of latch devices according to the invention.

FIG. 5 schematically illustrates an operation simulation of the source driver 400 with reduced number of latch devices according to the invention. When the latch enable signal S is at the low voltage VGG and the complementary latch enable signal SB is at the high voltage VPP, the master latch device 410 and the at least one slave latch device 420 are provided to latch data. As shown in FIG. 5, at the ellipse A, the latch enable signal S becomes the low voltage VGG, so that the first input signal D1 and the second input signal D2 are at the high voltage VPP, and the output FB 1 of the master latch device 410 and the output FB2 of the slave latch device 420 are latched at the high voltage VPP. At the ellipse B, the latch enable signal S becomes the high voltage VPP, so that the master latch device 410 and the slave latch device 420 are in a sample mode, and the outputs FB 1 and FB2 reflect the voltages of the first input signal D1 and the second input signal D2. At the ellipse C, the latch enable signal S returns to the low voltage VGG, so that the first input signal D1 and the second input signal D2 are at the low voltage VGG, and the outputs FB1 and FB2 are latched at the low voltage VGG.

From the operation simulation of FIG. 5, it is known that the present invention is able to assure the original function of a source driver while eliminating the use of first and second enable gates in the slave latch device 420. Thus, the number of devices and the area required for the source drivers are effectively saved, so as to achieve cost reduction.

Based on the fact that a source driver typically includes a large amount of latch devices, the present invention thus provides a source driver in which the number of transistors in the latch devices is reduced, so as to effectively reduce the layout area.

Figure 6A:
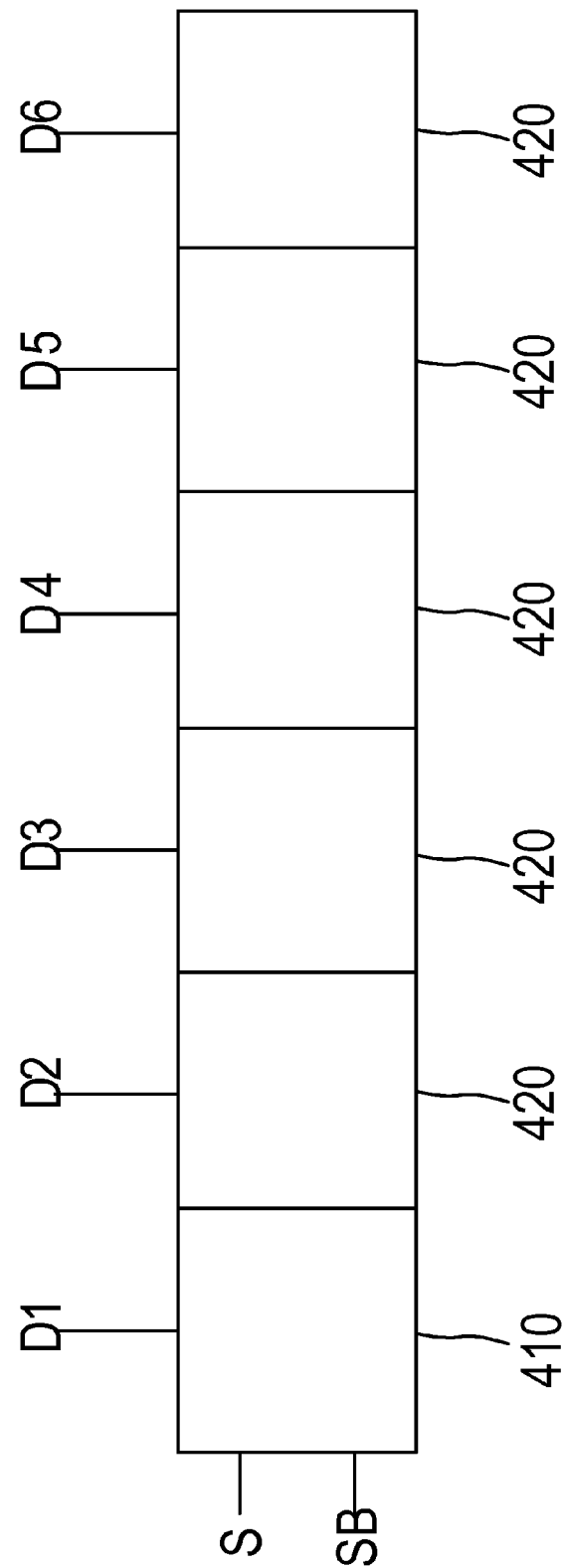
FIG. 6A schematically illustrates the connection of six latch devices according to the invention.
Figure 6B:
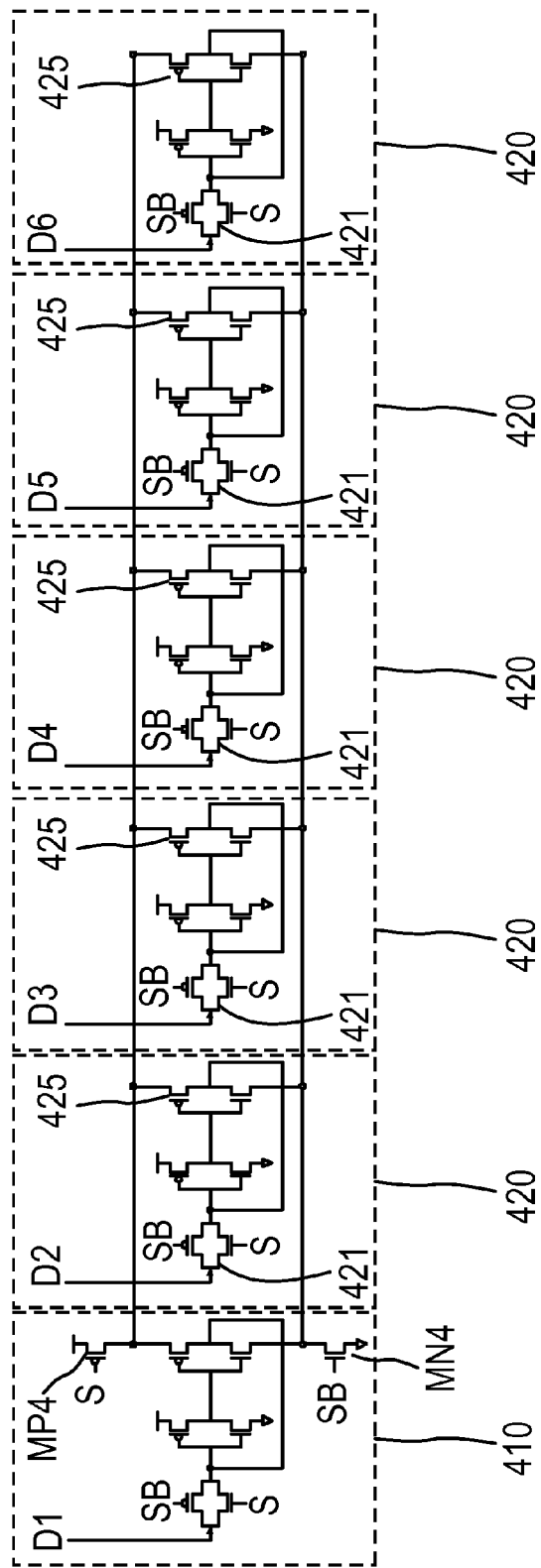
FIG. 6B is a circuit diagram of the connection of six latch devices according to the invention.

For outputting the analog voltage of a single R/G/B channel by a typical 6-bit source driver, it needs six latch devices to latch the 6-bit digital data. However, the present invention only retains the first and second enable gates (MP4 and MN4) of one of the latch devices, while eliminating the first and second enable gates (MP4 and MN4) of the remaining five latch devices, as shown in FIG. 6A which schematically illustrates the connection of six latch devices according to the present invention. FIG. 6B is a circuit diagram of the connection of six latch devices according to the present invention. As shown in FIG. 6B, the first second enable gate MP4 and the second enable gate MN4 of the master latch device 410 can control the latching operation of the at least one slave latch device 420. Thus, for a 6-bit source driver, it is able to save ten transistors. When the LCD module 120 has a resolution of 960×540, it requires at least 960×3 (R/G/B) 6-bit source drivers in total, and thus there are 28800(=960×3×10) transistors in total saved in this case.

In view of FIGS. 6A and 6B, it is known that the source driver 400 of the present invention may include a master latch device 410 and first to N-th slave latch devices 420, i.e., the number of slave latch devices 420 is generalized to be N, where N is an integer greater than one. Similarly, with reference to FIGS. 4 and 6B, the master latch device has a transmission gate 411, a first inverter 413, a second inverter 415, a first enable gate MP4, and a second enable gate MN4. The second inverter 415 has an output connected to an input of the first inverter 413. Each of the first to N-th slave latch devices 420 has a transmission gate 421, a third inverter 423, and a fourth inverter 425. The first enable gate MP4 and the second enable gate MN4 are respectively connected to the fourth inverter 425 of each of the first to N-th slave latch devices 420, resulting in that the fourth inverters 425 of the first to N-th slave latch devices 420 are connected in a parallel manner, i.e., the sources of the seventh PMOS transistors MP7 of all slave latch devices 420 are connected together and the drains of the seventh NMOS transistors MN7 of all slave latch devices 420 are connected together. The second transmission gates 421 of the first to N-th slave latch devices 420 receive second to (N+1)-th input signals (D2, D3, . . . , D6), respectively. The third inverters 423 perform phase inversions on the second to (N+1)-th input signals (D2, D3, . . . , D6), respectively. When the first enable gate MP4 receives a latch enable signal and the second enable gate MN4 receives a complementary latch enable signal, the master latch device 410 and the first to N-th slave latch devices 420 are concurrently driven to latch data.

In addition, when the gray level required for a single R/G/B channel is changed from six bits into eight bits, there are 14 transistors saved in the present invention. When the gray level is changed from six bits into 12 bits, there are 22 transistors saved in the present invention. Therefore, it is clear that the number of transistors that can be saved is increased more and more when the gray level corresponding to the resolution of a screen is getting higher and higher.

As cited, since the total number of transistors required in the circuit is decreased, the entire power consumption can be effectively reduced. Therefore, the invention is particularly suitable for a low-power handheld device.

Although the present invention has been explained in relation to its preferred embodiment, it is to be understood that many other possible modifications and variations can be made without departing from the spirit and scope of the invention as hereinafter claimed.

What is claimed is:

1. A source driver with reduced number of latch devices, comprising:
   a master latch device, having a first transmission gate, a first inverter, a second inverter, a first enable gate, and a second enable gate wherein an output of the second inverter connected to an input of the first inverter; and
   slave latch device, having a second transmission gate, a third inverter with an input connected to an output of the second transmission gate, and a fourth inverter with an input connected to an output of the third inverter and an output connected to the input of the third inverter, wherein the first transmission gate of the master latch device is connected to receive a first input signal and the second transmission gate of the slave latch device is connected to receive a second input signal; the first enable gate and the second enable gate are directly connected to the fourth inverter of the slave latch device, when the first enable gate receives a latch enable signal and the second enable gate receives a complementary latch enable signal, the master latch device and the slave latch device are driven to concurrently latch the first input signal and the second input signal, respectively.

2. The source driver as claimed in claim 1, wherein an input of the first inverter is connected to the first transmission gate to perform a phase inversion on the first input signal, the second inverter has an input connected to an output of the first inverter and an output connected to the input of the first inverter, and the first enable gate and the second enable gate are connected to the second inverter, so as to form the master latch device.

3. The source driver as claimed in claim 2, wherein the third inverter performs a phase inversion on the second input signal, and the fourth inverter is connected to the first enable gate and the second enable gate, so as to form the at least one slave latch device.

4. The source driver as claimed in claim 2, wherein the first transmission gate is comprised of a first PMOS transistor and a first NMOS transistor, the first inverter is comprised of a second PMOS transistor and a second NMOS transistor, the second inverter is comprised of a third PMOS transistor and a third NMOS transistor, the first enable gate is comprised of a fourth PMOS transistor, and the second enable gate is comprised of a fourth NMOS transistor.

5. The source driver as claimed in claim 4, wherein the second transmission gate is comprised of a fifth PMOS transistor and a fifth NMOS transistor, the third inverter is comprised of a sixth PMOS transistor and a sixth NMOS transistor, and the fourth inverter is comprised of a seventh PMOS transistor and a seventh NMOS transistor.

6. The source driver as claimed in claim 4, wherein the first PMOS transistor has a source to receive the first input signal and a gate connected to the complementary latch enable signal, and the first NMOS transistor has a drain connected to the first input signal, a gate to receive the latch enable signal, and a source connected to a drain of the first PMOS transistor.

7. The source driver as claimed in claim 6, wherein the second PMOS transistor has a source connected to a high voltage and a gate connected to the drain of the first PMOS transistor, and the second NMOS transistor has a drain connected to a drain of the second PMOS transistor, a gate connected to the drain of the first PMOS transistor, and a source connected to a low voltage.

8. The source driver as claimed in claim 7, wherein the fourth PMOS transistor has a source connected to the high voltage and a gate to receive the latch enable signal, and the fourth NMOS transistor has a source connected to the low voltage and a gate to receive the complementary latch enable signal.

9. The source driver as claimed in claim 8, wherein the third PMOS transistor has a source connected to a drain of the fourth PMOS transistor, a gate connected to the drain of the second PMOS transistor, and a drain connected to the drain of the first PMOS transistor and a first output terminal, and the third NMOS transistor has a source connected to a drain of the fourth NMOS transistor, a gate connected to the drain of the second PMOS transistor, and a drain connected to the drain of the third PMOS transistor.

10. The source driver as claimed in claim 4, wherein the fifth PMOS transistor has a source to receive the second input signal and a gate to receive the complementary latch enable signal, and the fifth NMOS transistor has a drain to receive the second input signal, a gate to receive the latch enable signal, and a source connected to a drain of the fifth PMOS transistor.

11. The source driver as claimed in claim 7, wherein the sixth PMOS transistor has a source connected to the high voltage and a gate connected to the drain of the fifth PMOS transistor, and the sixth NMOS transistor has a source connected to a drain of the sixth PMOS transistor, a gate connected to the drain of the fifth PMOS transistor, and a source connected to the low voltage.

12. The source driver as claimed in claim 11, wherein the seventh PMOS transistor has a source connected to the drain of the fourth PMOS transistor, a gate connected to the drain of the sixth PMOS transistor, and a drain connected to the drain of the fifth PMOS transistor, and the seventh NMOS transistor has a source connected to the drain of the fourth NMOS transistor, a gate connected to the drain of the sixth PMOS transistor, and a source connected to the drain of the seventh PMOS transistor.

13. A source driver with reduced number of latch devices, comprising:
   a master latch device, having a first transmission gate, a first inverter, a second inverter with an output connected to an input of the first inverter, a first enable gate, and a second enable gate; and
   first to N-th slave latch devices, the slave latch devices respectively having a second transmission gate, a third inverter, and a fourth inverter connected to the first enable gate and the second enable gate, where N is an integer greater than one,
   wherein the first transmission gate of the master latch device is connected to receive a first input signal and the second transmission gates of the first to N-th slave latch devices are connected to receive second input signal to N+1 input signal, respectively; the fourth inverters of the first to N-th slave latch devices are connected in a parallel manner, the first enable gate and the second enable gate are directly connected to the fourth inverters of the first to N-th slave latch devices, and when the first enable gate receives a latch enable signal and the second enable gate receives a complementary latch enable signal, the master latch device and the first to N-th slave latch devices are driven to concurrently latch the first input signal to the N+1 input signal, respectively.

14. The source driver as claimed in claim 13, wherein an input of the first inverter is connected to the first transmission gate to perform a phase inversion on the first input signal, the second inverter has an input connected to an output of the first inverter and an output connected to the input of the first inverter, and the first enable gate and the second enable gate are connected to the second inverter, so as to form the master latch device.

15. The source driver as claimed in claim 14, wherein the third inverters of the first to N-th slave latch devices perform phase inversions on the second to (N+1)-th input signals respectively, and the fourth inverters of the first to N-th slave latch devices are connected to the first enable gate and the second enable gate.

16. The source driver as claimed in claim 15, wherein for an i-th slave latch device, the second transmission gate is comprised of a fifth PMOS transistor and a fifth NMOS transistor, the third inverter is comprised of a sixth PMOS transistor and a sixth NMOS transistor, and the fourth inverter is comprised of a seventh PMOS transistor and a seventh NMOS transistor, where i=1 to N.

17. The source driver as claimed in claim 16, wherein for the i-th slave latch device, the fifth PMOS transistor has a source to receive an i-th input signal and a gate to receive the complementary latch enable signal, and the fifth NMOS transistor has a drain to receive the i-th input signal, a gate to receive the latch enable signal, and a source connected to a drain of the fifth PMOS transistor.

18. The source driver as claimed in claim 17, wherein for the i-th slave latch device, the sixth PMOS transistor has a source connected to the high voltage and a gate connected to the drain of the fifth PMOS transistor, and the sixth NMOS transistor has a source connected to a drain of the sixth PMOS transistor, a gate connected to the drain of the fifth PMOS transistor, and a source connected to the low voltage.

19. The source driver as claimed in claim 18, wherein for the i-th slave latch device, the seventh PMOS transistor has a source connected to a drain of a fourth PMOS transistor of the master latch device, a gate connected to the drain of the sixth PMOS transistor, and a drain connected to the drain of the fifth PMOS transistor and an i-th output terminal, and the seventh NMOS transistor has a source connected to a drain of a fourth NMOS transistor of the master latch device, a gate connected to the drain of the sixth PMOS transistor, and a source connected to the drain of the seventh PMOS transistor.

20. A source driver with reduced number of latch devices, comprising:
   a master latch device, having a first transmission gate, a first inverter, a second inverter, a first enable gate, and a second enable gate wherein an output of the second inverter connected to an input of the first inverter; and
   slave latch device, having a second transmission gate, a third inverter with an input connected to an output of the second transmission gate, and fourth inverter with an input connected to an output of the third inverter and an output connected to the input of the third inverter,
   wherein the first enable gate and the second enable gate are directly connected to the fourth inverter of the slave latch device in parallel, when the first enable gate receives a latch enable signal and the second enables gate receives a complementary latch enable signal, the master latch device and the slave latch device are driven to concurrently latch data.

* * * * *